United States Patent
Zhang et al.

(10) Patent No.: US 11,210,800 B2
(45) Date of Patent: Dec. 28, 2021

(54) METHOD, SYSTEM AND TERMINAL FOR GENERATING VERIFICATION TEMPLATE

(71) Applicant: GUANGDONG OPPO MOBILE TELECOMMUNICATIONS CORP., LTD., Guangdong (CN)

(72) Inventors: Xueyong Zhang, Guangdong (CN); Xiangnan Lyu, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 224 days.

(21) Appl. No.: 16/613,371

(22) PCT Filed: Apr. 25, 2019

(86) PCT No.: PCT/CN2019/084326
§ 371 (c)(1),
(2) Date: Nov. 13, 2019

(87) PCT Pub. No.: WO2019/228107
PCT Pub. Date: Dec. 5, 2019

(65) Prior Publication Data
US 2021/0334990 A1 Oct. 28, 2021

(30) Foreign Application Priority Data
May 29, 2018 (CN) .......................... 201810529884.8

(51) Int. Cl.
*G06T 7/80* (2017.01)
*G06T 7/521* (2017.01)
(Continued)

(52) U.S. Cl.
CPC .............. *G06T 7/521* (2017.01); *G01B 11/25* (2013.01); *G06F 21/57* (2013.01);
(Continued)

(58) Field of Classification Search
CPC ......... G06T 7/55; G06T 5/002; H04N 13/128; H04N 13/239; H04N 5/33; H04L 12/2816;
(Continued)

(56) References Cited

U.S. PATENT DOCUMENTS

2006/0115163 A1\* 6/2006 Nagaoka ................. G06T 7/337
382/209
2015/0339471 A1  11/2015 Bennett et al.
(Continued)

FOREIGN PATENT DOCUMENTS

CN 104700268 A 6/2015
CN 105513221 A 4/2016
(Continued)

OTHER PUBLICATIONS

English translation of OA for CN application 201810529884.8 dated Feb. 3, 2020.
(Continued)

*Primary Examiner* — Phuoc H Doan
(74) *Attorney, Agent, or Firm* — Young Basile Hanlon & MacFarlane, P.C.

(57) ABSTRACT

The present disclosure provides a method for generating a verification template. The verification template includes an infrared template and a depth template. The method includes: obtaining an infrared image of a target object and storing the infrared image into a trusted execution environment as the infrared template; controlling a laser projector to project laser light to the target object; obtaining a laser pattern modulated by the target object; and processing the laser pattern to obtain a depth image and storing the depth image into the trusted execution environment as the depth template.

19 Claims, 7 Drawing Sheets

(51) Int. Cl.
*G01B 11/25* (2006.01)
*G06F 21/57* (2013.01)

(52) U.S. Cl.
CPC ............ *G06F 2221/2141* (2013.01); *G06T 2207/10024* (2013.01); *G06T 2207/10028* (2013.01); *G06T 2207/10048* (2013.01)

(58) Field of Classification Search
CPC ............ G05B 19/05; G06K 9/00033; G06K 9/00912; G06K 9/2027; G06K 9/2036; G02B 27/425; G02B 27/44; G06F 21/32
See application file for complete search history.

(56) References Cited

U.S. PATENT DOCUMENTS

2018/0114050 A1* 4/2018 Abiko ................. G02B 27/425
2018/0121724 A1   5/2018 Ovsiannikov et al.

FOREIGN PATENT DOCUMENTS

| CN | 106226977 A | 12/2016 |
| CN | 106548152 A | 3/2017 |
| CN | 107292283 A | 10/2017 |
| CN | 107341473 A | 11/2017 |
| CN | 107609383 A | 1/2018 |
| CN | 107862266 A | 3/2018 |
| CN | 108052878 A | 5/2018 |
| CN | 108804900 A | 11/2018 |

OTHER PUBLICATIONS

Search report for EP application 19794870.6 dated Jun. 16, 2020.
English translation of Second OA for CN application 201810529884.8 dated Sep. 2, 2020.
India Office Action for IN Application 201917044727 dated Mar. 19, 2021.
China Rejection with English Translation for CN Application 201810529884.8 dated Apr. 2, 2021.
Liu Peng, Liu Fang, "Driver's Road Rage Expression Recognition Method Combined with Facial Infrared Information and Depth Information" vol. 16, No. 10, Software Guide, School of Computer Science and Communication Engineering, Jiangsu University, Oct. 16, 2017 (Oct. 16, 2017), pp. 198-201.
Su Jianbo et al. "Introduction to Applied Pattern Recognition Technology: Face Recognition and Speech Recognition" Other Face Recognition Methods, Shanghai Jiaotong University Press, May 2001, pp. 69-70.
Search report No. G1810067 with English Translation for Priority Chinese Patent Application No. 201810529884.8, dated Oct. 12, 2018.
International search report with English translation issued for corresponding App. No. PCT/CN2019/084326, dated Jul. 25, 2019.
Communication pursuant to Article 94(3) EPC for EP Application 19794870.6 dated Oct. 5, 2021. (6 pages).

* cited by examiner

METHOD, SYSTEM AND TERMINAL FOR GENERATING VERIFICATION TEMPLATE

CROSS-REFERENCE TO RELATED APPLICATION(S)

This application is a 371 application of International Application No. PCT/CN2019/084326, filed on Apr. 25, 2019, which claims priority to Chinese Patent Application Serial No. 201810529884.8, filed on May 29, 2018, the entire content of both of which are incorporated herein by reference in their entireties.

TECHNICAL FIELD

The present disclosure relates to a field of information security technology, and more particularly to a method and a system for generating a verification template, a terminal, a non-transitory computer readable storage medium, and a computer device.

BACKGROUND

In the related art, an electronic device generally verifies whether a use has a relevant usage right by comparing a difference between a face image input by the user and a pre-stored face image template.

SUMMARY

Embodiments of the present disclosure provide a method for generating a verification template, a system for generating a verification template, a terminal, a non-transitory computer readable storage medium, and computer device.

The verification template according to embodiments of the present disclosure includes an infrared template and a depth template. The method for generating the verification template includes: obtaining an infrared image of a target object, and storing the infrared image into a trusted execution environment as the infrared template; controlling a laser projector to project laser light to the target object; obtaining a laser pattern modulated by the target object; and processing the laser pattern to obtain a depth image, and storing the depth image into the trusted execution environment as the depth template.

The system for generating the verification template according to embodiments of the present disclosure includes a microprocessor and an application processor. The microprocessor is configured to: obtain an infrared image of a target object, and store the infrared image into a trusted execution environment as the infrared template; control a laser projector to project laser light to the target object; obtain a laser pattern modulated by the target object; and process the laser pattern to obtain a depth image, and store the depth image into the trusted execution environment as the depth template.

The terminal for generating a verification template according to embodiments of the present disclosure includes an infrared camera, a laser projector, a microprocessor and an application processor. The infrared camera is configured to collect an infrared image of a target object. The laser projector is configured to project laser light to the target object. The microprocessor is configured to: obtain the infrared image of the target object, and store the infrared image into a trusted execution environment; control the laser projector to project the laser light to the target object as the infrared template; obtain a laser pattern modulated by the target object; and process the laser pattern to obtain a depth image, and store the depth image into the trusted execution environment as the depth template.

One or more non-transitory computer readable storage medium containing computer executable instructions according to embodiments of the present disclosure, when the computer executable instructions are executed by one or more processors, causes the processors to perform the method for generating a verification template according to embodiments of the present disclosure.

The computer device according to embodiments of the present disclosure includes a memory and a processor. The memory has computer readable instructions stored thereon, when the computer readable instructions are executed by the processor, causing the processor to perform the method for generating a verification template according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily appreciated from the following descriptions made with reference to the drawings, in which.

DETAILED DESCRIPTION

Figure 1:
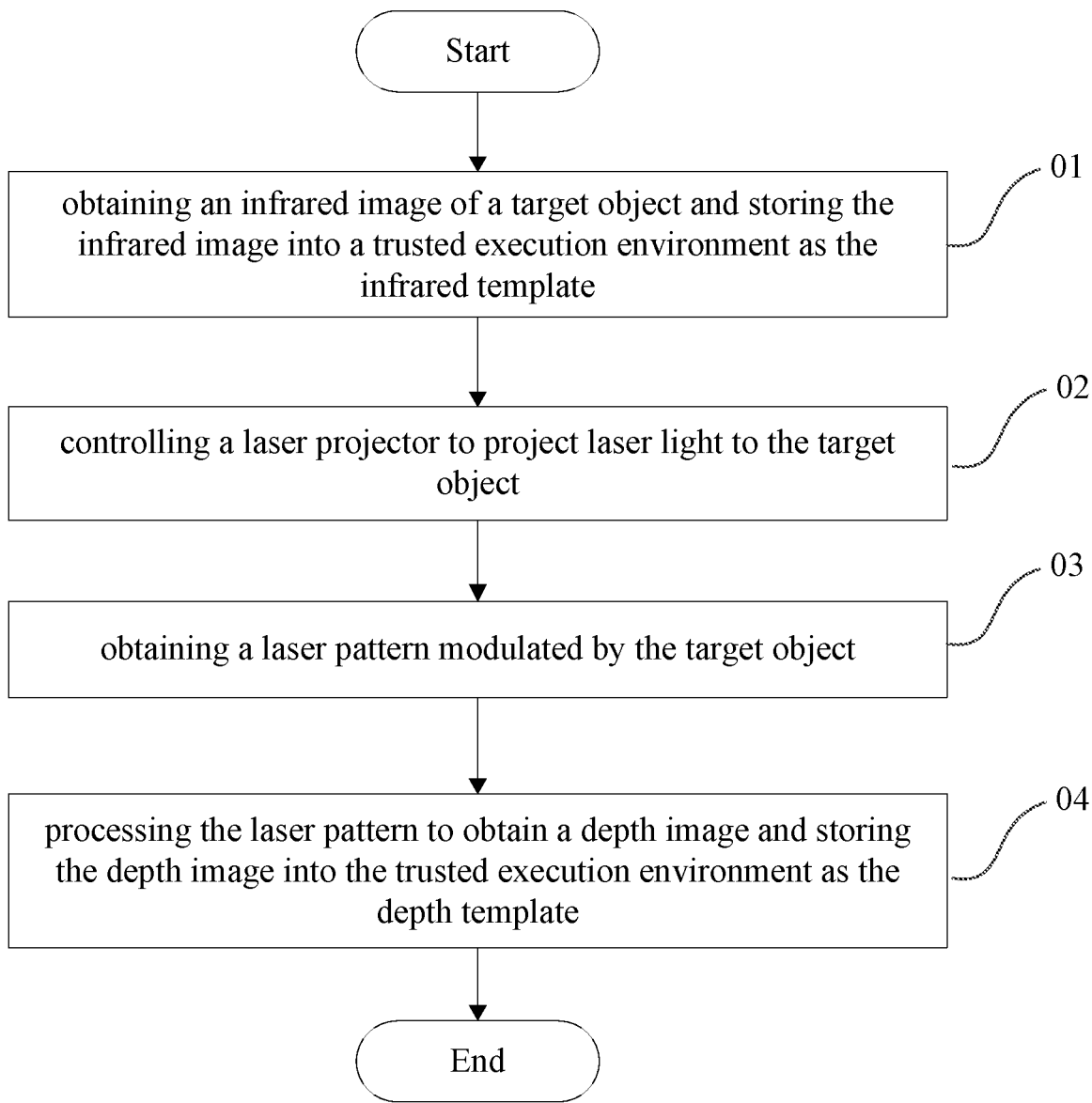
FIG. 1 is a flow chart of a method for generating a verification template according to an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

However, the face image template is easy to be tampered or stolen, resulting in lower security of information within the electronic device.

Therefore, embodiments of the present disclosure provide a method for generating a verification template, a system for generating a verification template, a terminal, a non-transitory computer readable storage medium, and computer device.

A verification template according to embodiments of the present disclosure includes an infrared template and a depth template. A method for generating a verification template includes: obtaining an infrared image of a target object, and storing the infrared image into a trusted execution environment as the infrared template; controlling a laser projector to project laser light to the target object; obtaining a laser pattern modulated by the target object; and processing the laser pattern to obtain a depth image, and storing the depth image into the trusted execution environment as the depth template.

In some embodiments, the method further includes: obtaining a color image of the target object, and storing the color image into a rich execution environment; and obtaining the color image from the rich execution environment, and controlling a display screen to display the color image.

In some embodiments, obtaining the laser pattern modulated by the target object includes obtaining a plurality of laser pattern frames modulated by the target object. Processing the laser pattern to obtain the depth image includes processing each of the plurality of laser pattern frames to obtain a plurality of initial depth image frames and combining the plurality of initial depth image frames to obtain the depth image.

In some embodiments, the plurality of initial depth image frames are obtained from a plurality of different angles.

In some embodiments, codes and a memory area in the trusted execution environment are controlled by an access control unit, and are inaccessible to programs in the rich execution environment.

A system for generating a verification template according to embodiments of the present disclosure includes a microprocessor and an application processor. The microprocessor is configured to: obtain an infrared image of a target object, and store the infrared image into a trusted execution environment as the infrared template; control a laser projector to project laser light to the target object; obtain a laser pattern modulated by the target object; and process the laser pattern to obtain a depth image, and store the depth image into the trusted execution environment as the depth template.

In some embodiments, the application processor is configured to: obtain a color image of the target object, and store the color image into a rich execution environment; and obtain the color image from the rich execution environment, and control a display screen to display the color image.

In some embodiments, the microprocessor is configured to: obtain a plurality of laser pattern frames modulated by the target object; process each of the plurality of laser pattern frames to obtain a plurality of initial depth image frames; and combine the plurality of initial depth image frames to obtain the depth image.

In some embodiments, the microprocessor is coupled to the trusted execution environment via a mobile industry processor interface (MIPI).

A terminal for generating a verification template according to an embodiment of the present disclosure includes an infrared camera, a laser projector, a microprocessor and an application processor The infrared camera is configured to collect an infrared image of a target object. The laser projector is configured to project laser light to the target object. The microprocessor is configured to: obtain the infrared image of the target object, and store the infrared image into a trusted execution environment as the infrared template; control the laser projector to project the laser light to the target object; obtain a laser pattern modulated by the target object; and process the laser pattern to obtain a depth image, and store the depth image into the trusted execution environment as the depth template.

One or more non-transitory computer readable storage medium containing computer executable instructions according to an embodiment of the present disclosure, when the computer executable instructions are executed by one or more processors, causes the processors to perform the method for generating a verification template according to any one of above embodiments.

A computer device according to an embodiment of the present disclosure includes a memory and a processor. The memory has computer readable instructions stored thereon, when the computer readable instructions are executed by the processor, causing the processor to perform the method for generating a verification template according to any one of above embodiments.

With the method for generating a verification template, the system for generating a verification template, the terminal, the non-transitory computer readable storage medium, and the computer device, both the obtained infrared template and the obtained depth template are stored in the trusted execution environment, the verification template in the trusted execution environment is not easy to be tampered and stolen, and security of the information in the terminal is relatively high.

In the following, the verification method, the verification device and the electronic device will be described in detail with reference to the drawings.

As illustrated in FIG. 1, the embodiments of the present disclosure provide a method for generating a verification template. The verification template includes an infrared template and a depth template. The method for generating the verification template includes the following actions.

At block 01, an infrared image of a target object is obtained, and the infrared image is stored into a trusted execution environment as the infrared template.

At block 02, a laser projector is controlled to project laser light to the target object.

At block 03, a laser pattern modulated by the target object is obtained.

At block 04, the laser pattern is processed to obtain a depth image, and the depth image is stored into the trusted execution environment as the depth template.

Figure 2:
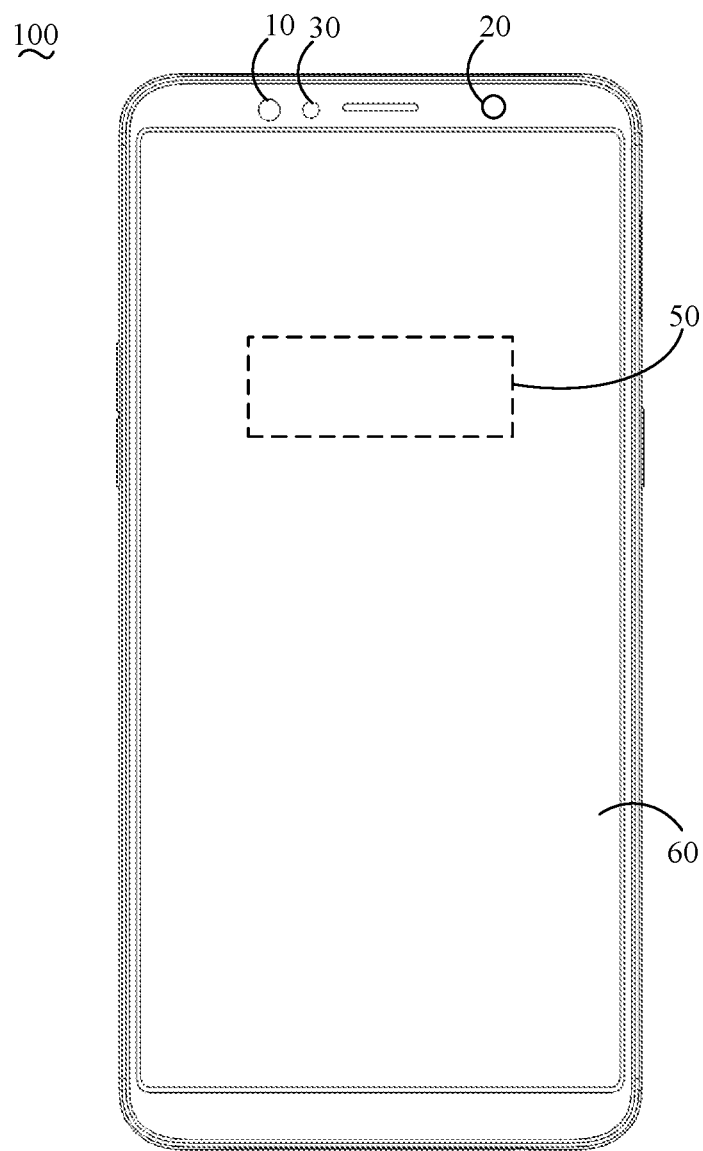
FIG. 2 is a schematic diagram illustrating structure of a terminal according to an embodiment of the present disclosure.
Figure 3:
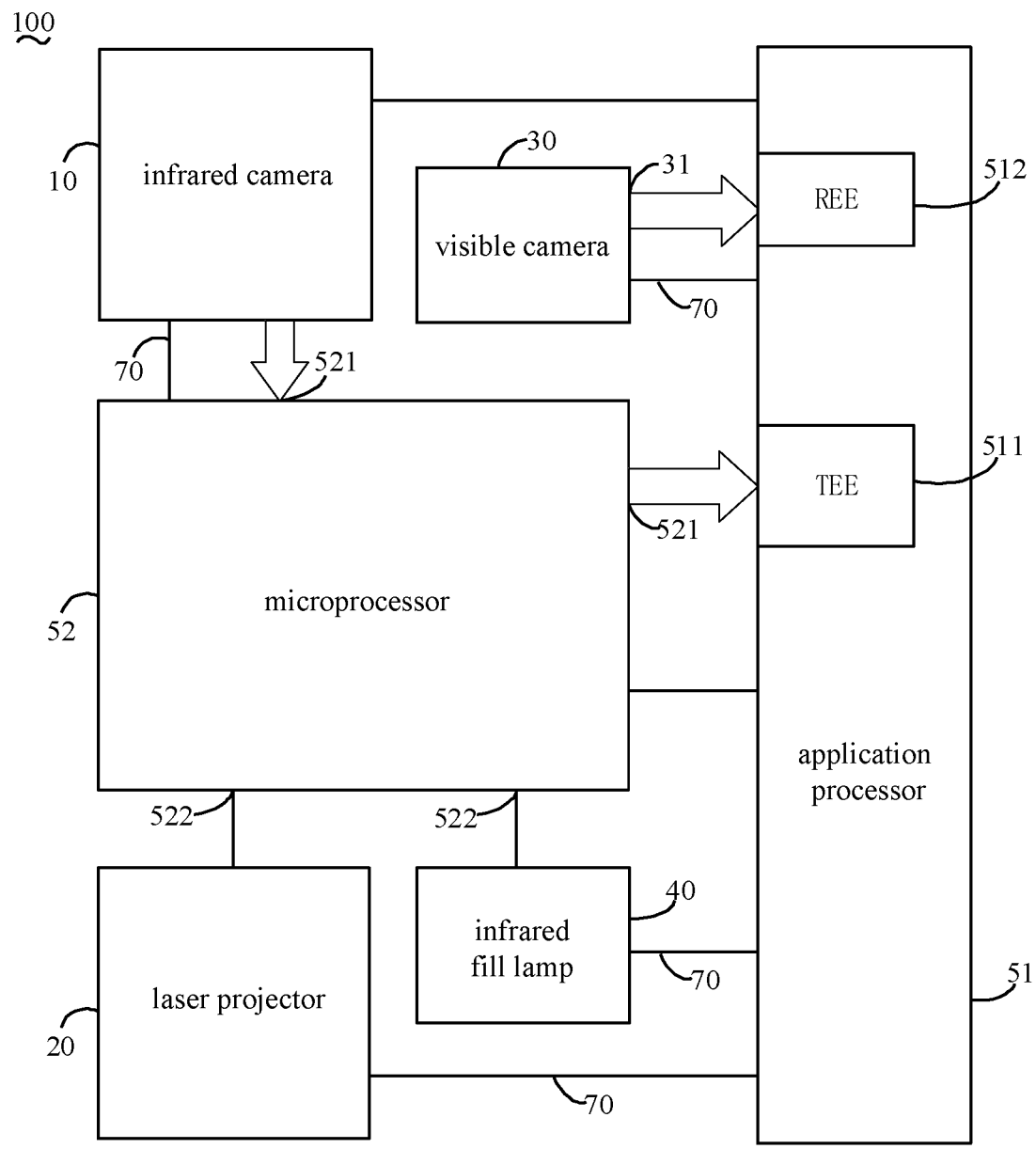
FIG. 3 is a block diagram illustrating a terminal according to an embodiment of the present disclosure.

As illustrated in FIG. 2 and FIG. 3, a terminal 100 according to an embodiment of the present disclosure includes an infrared camera 10, a laser projector 20, and the system 50 for generating a verification template. The infrared camera 10 may be configured to collect the infrared image of the target object. The laser projector 20 is configured to project the laser light to the target object. The system 50 for generating a verification template is configured to implement the method for generating a verification template. The system 50 for generating a verification template may include an application processor (AP) 51 and a microprocessor 52. The application processor 51 is formed with the trusted execution environment (TEE) 511. The microprocessor 52 may be configured to implement above actions at blocks 01, 02, 03 and 04. That is, the microprocessor 52 may be configured to obtain the infrared image of the target object, to store the infrared image into the trusted execution environment 511 of the application processor 51 as the infrared template, to control the laser projector 20 to project the laser light to the target object, to obtain the laser pattern modulated by the target object, to process the laser pattern to obtain the depth image, and to store the depth image into the trusted execution environment 511 as the depth template.

The verification template refers to a reference, input to the terminal 100 by a user in advance, for comparing a verification element input subsequently. When a similarity between the verification element input subsequently and the verification template is greater than a preset value, it is determined that the verification is successful, otherwise, the verification is failed. In an embodiment of the present disclosure, the verification template includes the infrared template and the depth template. The infrared template may be a face infrared image of a user, and the face infrared image may be a flat image. The depth template may be a face depth image of the user. The depth image may be obtained by means of structured light detection. During an actual verification process, an infrared image of a scene before the terminal 100 may be obtained, and the infrared image of the scene before the terminal 100 may be compared with the infrared template to determine whether a face image matched with the face infrared image exists in the infrared image of the scene before the terminal 100. Further, after the verification of the infrared template is successful, a depth image of the scene before the terminal 100 is obtained, and the depth image of the scene before the terminal 100 is compared with the depth template to determine whether a face image matched with the face depth image in the depth template exists in the depth image of the scene before the terminal 100. After the user passes the verification, relevant operation authorities, such as unlocking the screen, payment, etc., at the terminal 100 are obtained.

As illustrated in FIG. 2 and FIG. 3, the terminal 100 may be a mobile phone, a tablet computer, a smart watch, a smart bracelet, a smart wearable device, and the like. In an embodiment of the present disclosure, for example, the terminal 100 is the mobile phone. It can be understood that, a specific form of the terminal 100 is not limited to the mobile phone. The infrared image of the target object may be collected by the infrared camera 10. The infrared camera 10 may be coupled to the application processor 51. The application processor 51 may be configured to control the power of the infrared camera 10 to switch on or off, to power down the infrared camera 10, or to reset the infrared camera 10. At the same time, the infrared camera 10 may also be coupled to the microprocessor 52. The microprocessor 52 and the infrared camera 10 may be coupled to each other via an inter-integrated circuit (I2C) bus 70. The microprocessor 52 may provide the infrared camera 10 with clock information for collecting the infrared image. The infrared image collected by the infrared camera 10 may be transmitted to the microprocessor 52 via a mobile industry processor interface (MIPI) 521. In an embodiment of the present disclosure, the terminal 100 may further include an infrared fill lamp 40. The infrared fill lamp 40 may be configured to emit infrared light. The infrared light is reflected by the user and then received by the infrared camera 10. The infrared fill lamp 40 may be coupled to the application processor 51 via the inter-integrated circuit bus. The application processor 51 may be configured to enable the infrared fill lamp 40. The infrared fill lamp 40 may also be coupled to the microprocessor 52. In detail, the infrared fill lamp 40 may be coupled to a pulse width modulation (PWM) interface 522 of the microprocessor 52.

The laser projector 20 of the terminal 100 may project laser light to the target object. The laser projector 20 may be coupled to the application processor 51. The application processor 51 may be configured to enable the laser projector 20 and be coupled to the laser projector 20 via the inter-integrated circuit bus 70. The laser projector 20 may also be coupled to the microprocessor 52. In detail, the laser projector 20 may be coupled to the pulse width modulation interface 522 of the microprocessor 52.

The microprocessor 52 may be a processing chip. The microprocessor 52 is coupled to the application processor 51. In detail, the application processor 51 may be configured to reset the microprocessor 52, to wake up the microprocessor 52, to debug the microprocessor 52, and the like. The microprocessor 52 may be coupled to the application processor 51 via the mobile industry processor interface 521. In detail, the microprocessor 52 is coupled to the trusted execution environment 511 of the application processor 51 via the mobile industry processor interface 521 and to directly transmit data in the microprocessor 52 to the trusted execution environment 511 for storage. Codes and a memory area in the trusted execution environment 511 are controlled by an access control unit and are inaccessible to programs in the rich execution environment 512. Both the trusted execution environment 511 and the rich execution environment 512 may be formed in the application processor 51.

The microprocessor 52 may obtain the infrared image by receiving the infrared image collected by the infrared camera 10. The microprocessor 52 may transmit the infrared image to the trusted execution environment 511 via the mobile industry processor interface 521. The infrared image output by the microprocessor 52 may not enter the rich execution environment 512 of the application processor 51, thus the infrared image may not be obtained by other program, improving the information security of the terminal 100. The infrared image stored in the trusted execution environment 511 may be taken as the infrared template.

After the microprocessor 52 controls the laser projector 20 to project the laser light to the target object, the microprocessor 52 may further control the infrared camera 10 to collect the laser pattern modulated by the target object. Then the microprocessor 52 obtains the laser pattern via the mobile industry processor interface 521. The microprocessor 52 processes the laser pattern to obtain a depth image. In detail, calibration information of the laser light projected by the laser projector 20 may be stored in the microprocessor 52. The microprocessor 52 obtains the depth information at different positions of the target object by processing the laser pattern and the calibration information, and the depth image is formed. After the depth image is obtained, the depth image is transmitted to the trusted execution environment 511 via the mobile industry processor interface 521. The depth image stored in the trusted execution environment 511 may be taken as the depth template.

In conclusion, in the method for generating a verification template and the terminal 100 according to the embodiments of the present disclosure, both the obtained infrared template and the obtained depth template are stored in the trusted execution environment 511, the verification template in the trusted execution environment 511 is not easy to be tampered and stolen, and the security of the information in the terminal 100 is relatively high.

Figure 4:
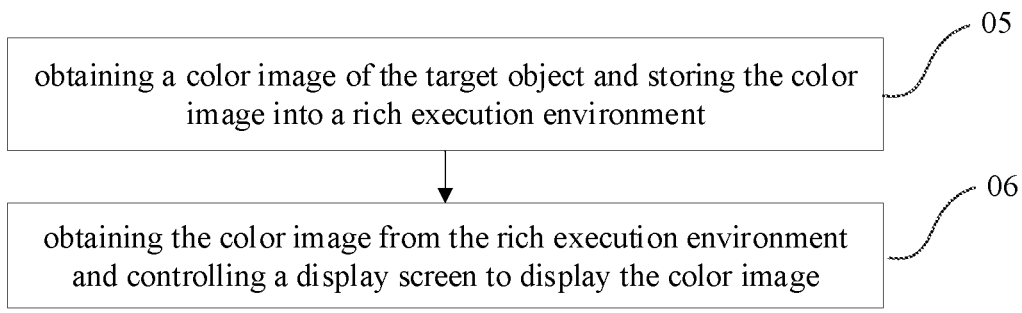
FIG. 4 is a flow chart of a method for generating a verification template according to an embodiment of the present disclosure.

As illustrated in FIG. 2 to FIG. 4, in some embodiments, the method for generating a verification template may further include the following actions.

At block 05, a color image of the target object is obtained, and the color image is stored into the rich execution environment 512.

At block 06, the color image is obtained from the rich execution environment 512, and a display screen 60 is controlled to display the color image.

In some embodiments, the application processor 51 may be configured to implement actions at blocks 05 and 06. That is, the application processor 51 may be configured to obtain the color image of the target object, to store the color image into the rich execution environment 512, to obtain the color image from the rich execution environment 512, and to control the display screen 60 to display the color image.

In detail, the terminal 100 may further include a visible camera 30. The visible camera 30 is coupled to the application processor 51. In detail, the visible camera 30 may be coupled to the application processor 51 via the inter-integrated circuit interface 70 or the mobile industry processor interface 521. The application processor 51 may be configured to enable the visible camera 30, to power down the visible camera 30, or to reset the visible camera 30. The visible camera 30 may be configured to collect the color image. The application processor 51 may obtain the color image from the visible camera 30 via the mobile industry processor interface 521, and may store the color image to the rich execution environment 512. Data stored in the rich execution environment 512 may be acquired by other program. In an embodiment of the present disclosure, the color image may be obtained by the application processor 51, and may be displayed on the display screen 60 of the terminal 100. The visible camera 30 and the infrared camera 10 may work simultaneously. Obtaining the color image by the application processor 51 and obtaining the laser pattern by the microprocessor 52 may be implemented simultaneously. The user may adjust orientation of the head by observing the color image displayed in the display screen 60 to facilitate the infrared camera 10 to obtain a more accurate face image or laser pattern.

Figure 5:
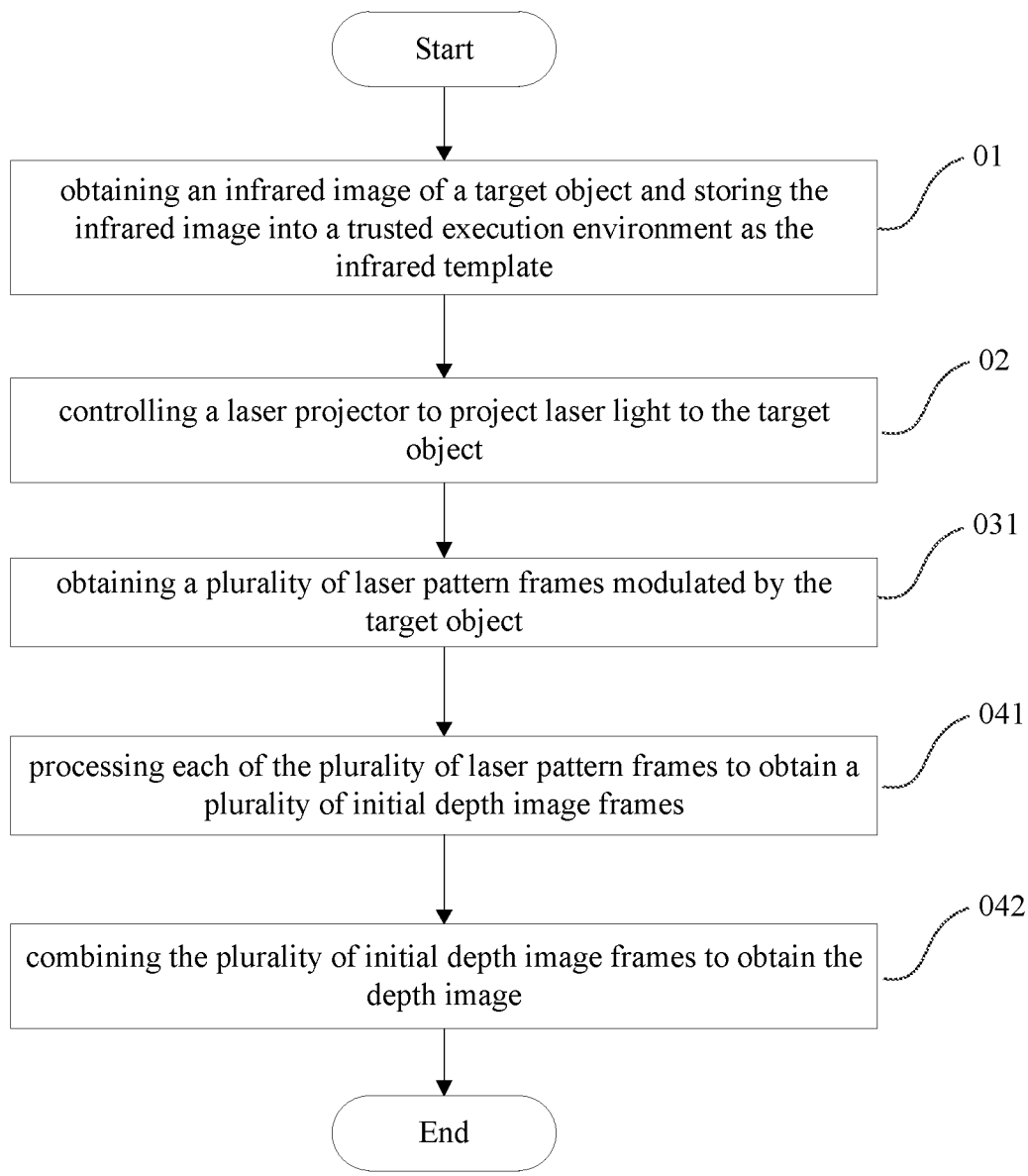
FIG. 5 is a flow chart of a method for generating a verification template according to an embodiment of the present disclosure.

As illustrated in FIG. 2, FIG. 3, and FIG. 5, in some embodiments, the action at block 03 may include an action at block 031.

At block 031, a plurality of laser pattern frames modulated by the target object are obtained.

The action at block 04 may include the following actions.

At block 041, each of the plurality of laser pattern frames is processed to obtain a plurality of initial depth image frames.

At block 042, the plurality of initial depth image frames is combined to obtain the depth image.

In some embodiments, the actions at blocks 031, 041, and 042 may be implemented by the microprocessor 52. That is, the microprocessor 52 may be configured to obtain the plurality of the laser pattern frames modulated by the target object, to process each of the plurality of laser pattern frames to obtain the plurality of initial depth image frames, and to combine the plurality of the initial depth image frames to obtain the depth image.

In detail, the final depth image regarded as the depth template may be obtained by combining a plurality of initial depth image frames of user's face obtained at a plurality of different angles. The plurality of initial depth image frames may be obtained by processing the plurality of laser pattern frames, and the plurality of laser pattern frames may be obtained when the head of user swings to different angles. For example, the head of the user may perform swing action such as left swing, right swing, up swing, and down swing under guidance of the display content of the display screen 60. During the swing process, the laser projector 20 may project the laser light to the user's face continuously. The infrared camera 10 collects the plurality of laser pattern frames modulated by the target object. The microprocessor 20 obtains the plurality of laser pattern frames and processes the plurality of laser pattern frames to obtain the plurality of initial depth image frames. The microprocessor 20 processes the plurality of initial depth image frames to obtain the final depth image. The final depth image includes the depth information at different angles such as front, left, right, and lower sides of the user's face. Thus, when the user is required to be verified, the user's face at different angles may be obtained and be compared with the depth template, instead of requiring the user to align the infrared camera 10 strictly according to a certain angle, shortening verification time of the user.

Figure 6:
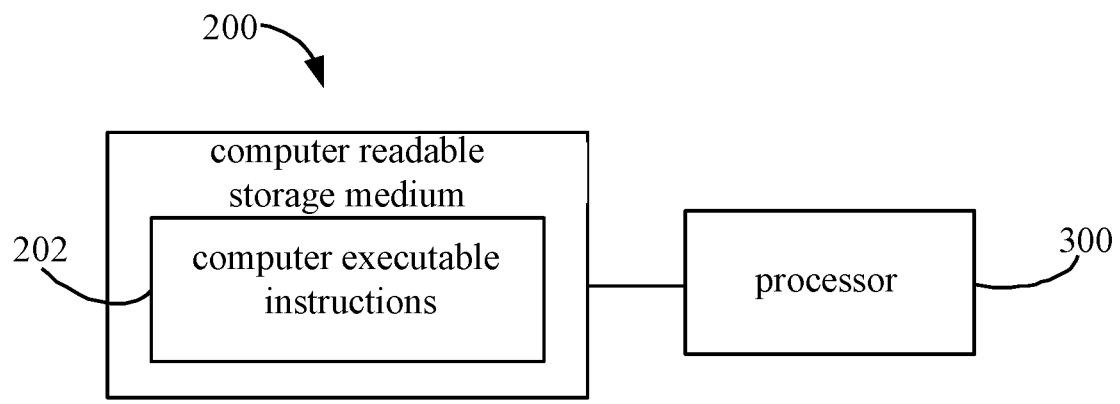
FIG. 6 is a block diagram illustrating a computer readable storage medium and a processor according to an embodiment of the present disclosure.

As illustrated in FIG. 6, the embodiments of the present disclosure may further provide a computer readable storage medium 200. One or more non-transitory computer readable storage medium 200 contains computer executable instructions 202. When the computer executable instructions 202 are executed by one or more processors 300, the processors 300 are caused to perform the method for generating a verification template according to any one of the above embodiments. For example, the following actions may be implemented. At block 01, an infrared image of a target object is obtained, and the infrared image is stored into a trusted execution environment 511 as the infrared template. At block 02, a laser projector 20 is controlled to project laser light to the target object. At block 03, a laser pattern modulated by the target object is obtained. At block 04, the laser pattern is processed to obtain a depth image, and the depth image is stored into the trusted execution environment 511 as the depth template.

Figure 7:
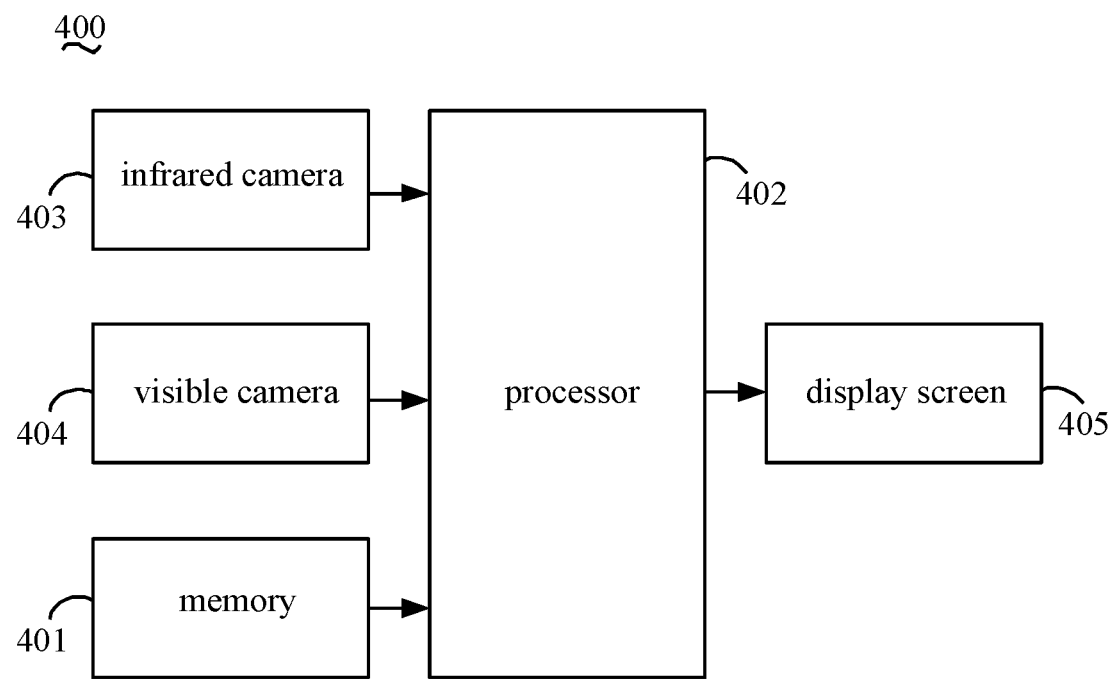
FIG. 7 is a block diagram illustrating a computer device according to an embodiment of the present disclosure.

As illustrated in FIG. 7, the embodiments of the present disclosure may further provide a computer device 400. The computer device 400 includes a memory 401 and a processor 402. The memory 401 has computer readable instructions stored thereon. When the computer readable instructions are executed by the processor 402, the processor 402 implements the method for generating a verification template according to any one of the above embodiments. For example, the following actions may be implemented. At block 01, an infrared image of a target object is obtained, and the infrared image is stored into a trusted execution environment 511 as the infrared template. At block 02, a laser projector 20 is controlled to project laser light to the target object. At block 03, a laser pattern modulated by the target object is obtained. At block 04, the laser pattern is processed to obtain a depth image, and the depth image is stored into the trusted execution environment 511 as the depth template. In addition, the computer device 400 may further includes electronic components such as an infrared camera 403, a visible camera 404, a display screen 405, and the like. The infrared camera 403 may be configured to collect the infrared image of the target object or the laser pattern modulated by the target object. The visible camera 404 may be used to collect a color image of the target object. The display screen 405 may be configured to display the infrared image, the color image, the laser pattern, etc., obtained by the processor.

Figure 8:
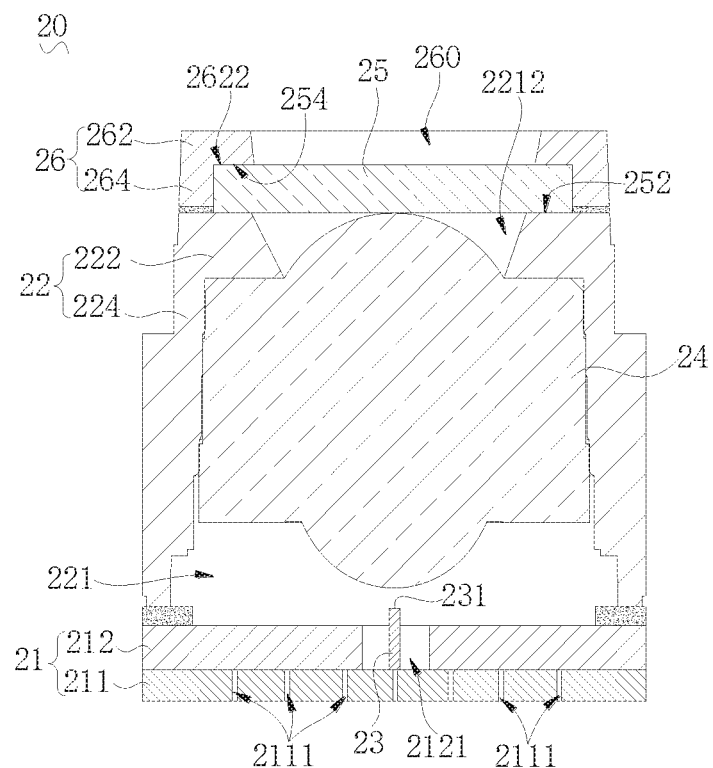
FIG. 8 is a schematic diagram illustrating structure of a laser projector according to an embodiment of the present disclosure.

As illustrated in FIG. 8, in some embodiments, the laser projector 20 includes a substrate component 21, a lens cone 22, a light source 23, a collimation element 24, a diffractive optical element (DOE) 25, and a protective cover 26.

The substrate component 21 includes a substrate 211 and a circuit board 212. The circuit board 212 is disposed on the substrate 211. The circuit board 212 is configured to couple the light source 23 to a main board of the terminal 100. The circuit board 212 may be a hard board, a soft board, or a combination of a soft board and a hard board. In the embodiment illustrated in FIG. 8, a through hole 2121 is defined on the circuit board 212. The light source 23 is fixed on the substrate 211 and is electrically coupled to the circuit board 212. A heat dissipation hole 2111 may be defined on the substrate 211. Heat generated by operation of the light source 23 or the circuit board 212 may be dissipated by the heat dissipation hole 2111. The heat dissipation hole 2111 may be filled with thermal conductive adhesive, to further improve heat dissipation performance of the substrate component 21.

The lens cone 22 is fixedly coupled to the substrate component 21. A receiving cavity 221 is defined in the lens cone 22. The lens cone 22 includes a top wall 222 and an annular peripheral wall 224 extending from the top wall 222. The peripheral wall 224 is disposed on the substrate component 21. The top wall 222 is provided with a light through hole 2212 communicating with the receiving cavity 221. The peripheral wall 224 may be coupled to the circuit board 212 by glue.

The protective cover 26 is disposed on the top wall 222. The protective cover 26 includes a baffle 262 provided with a through hole 260 for light exiting and an annular peripheral wall 264 extending from the baffle 262.

Both the light source 23 and the collimation element 24 are disposed in the receiving cavity 221. The diffractive optical element 25 is disposed on the lens cone 22. The collimation element 24 and the diffractive optical element 25 are disposed on a light path of light emitting of the light source 23 successively. The collimation element 24 is configured to collimate laser light emitted by the light source 23. The laser passes through the collimation element 24, and then passes through the diffractive optical element 25 to form the laser pattern.

Figure 9:
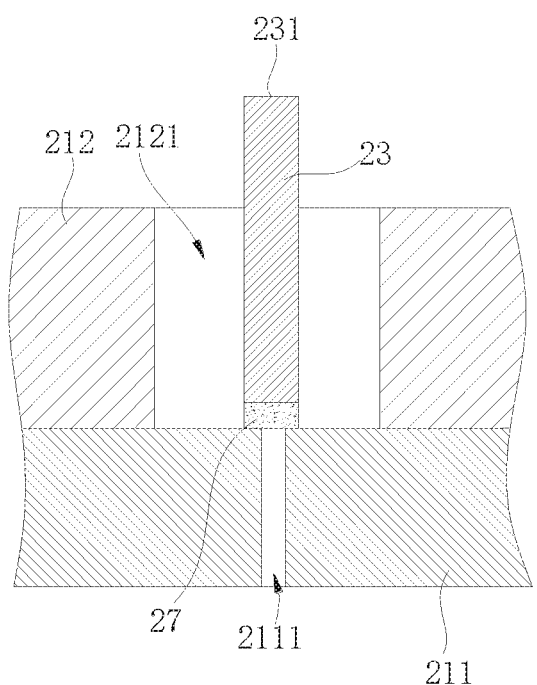
FIGS. 9 to 11 are schematic diagrams illustrating portion structure of a laser projector according to embodiments of the present disclosure.
Figure 10:
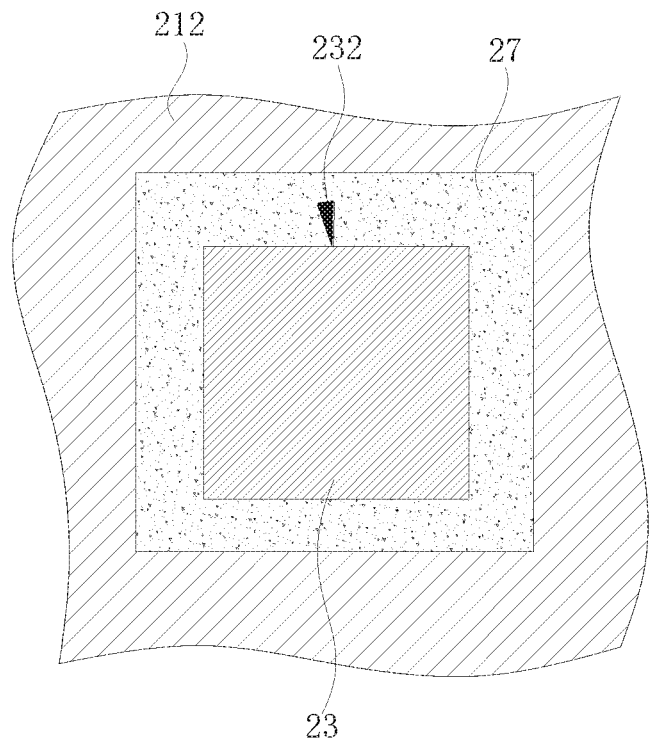

The light source 23 may be a vertical cavity surface emitting laser (VCSEL) or an edge-emitting laser (EEL). In the embodiment illustrated in FIG. 8, the light source 23 is the edge-emitting laser. In detail, the light source 23 may be a distributed feedback laser (DFB). The light source 23 is configured to emit laser light into the receiving cavity 221. As illustrated in FIG. 9, the light source 23 is generally columnar. An end surface of the light source 23 away from the substrate component 21 forms a light emitting surface 231. The laser light is emitted from the light emitting surface 231. The light emitting surface 231 faces the collimation element 24. The light source 23 is fixed on the substrate component 21. In detail, the light source 23 may be bonded to the substrate component 21 by sealant 27. For example, a side of the light source 23 opposite the light emitting surface 231 is bonded to the substrate component 21. As illustrated in FIG. 8 and FIG. 10, side surfaces 232 of the light source 23 may also be bonded to the substrate component 21. The sealant 27 may wrap around the side surfaces 232. Alternatively, only one or some of the side surfaces 232 may be bonded to the substrate component 21. At this time, the sealant 27 may be a thermal conductive adhesive to transfer heat generated by the operation of the light source 23 to the substrate component 21.

As illustrated in FIG. 8, the diffractive optical element 25 is carried by the top wall 222 and housed within the protective cover 26. Two opposite sides of the diffractive optical element 25 are respectively pressed against the protective cover 26 and the top wall 222. The baffle 262 includes a resisting surface 2622 adjacent to the light through hole 2212, and the diffractive optical element 25 is pressed against the resisting surface 2622.

In detail, the diffractive optical element 25 includes a diffractive incident plane 252 and a diffractive emission plane 254 opposite to each other. The diffractive optical element 25 is carried by the top wall 222. The diffractive emission plane 254 is pressed against a surface (i.e. the resisting surface 2622) adjacent to the light through hole 2212 of the baffle 262. The diffractive incident plane 252 is pressed against the top wall 222. The light through hole 2212 is aligned with the receiving cavity 221, and the through hole 260 for light exiting is aligned with the light through hole 2212. The top wall 222, the annular peripheral wall 264, and the baffle 262 are pressed against the diffractive optical element 25, thereby preventing the diffractive optical element 25 from falling out of the protective cover 26 in a light exiting direction. In some embodiments, the protective cover 26 is bonded to the top wall 222 by glue.

The light source 23 of above laser projector 20 adopts the edge emitting laser. On the one hand, a temperature shift of the edge emitting laser is smaller than that of the VCSEL array. On the other hand, since the edge emitting laser is a single-point light emitting structure, it is not necessary to design an array structure, which is easy to manufacture, and the light source of the laser projector 20 is low in cost.

When the laser of the distributed feedback laser is propagated, the power gained is obtained through feedback of a grating structure. To increase the power of the distributed feedback laser, the injection current may be increased and/or the length of the distributed feedback laser may be increased. As the injection current increases, the power consumption of the distributed feedback laser increases and a problem of serious heating may be generated. Therefore, in order to ensure that the distributed feedback laser can work normally, the length of the distributed feedback laser may be increased, resulting in a distributed feedback laser generally having a slender structure. When the light emitting surface 231 of the edge emitting laser faces the collimation element 24, the edge emitting laser is placed vertically. Since the edge emitting laser has a slender structure, the edge emitting laser is prone to accidents such as dropping, shifting or shaking, and thus the setting of the sealant 27 is capable to hold the edge emitting laser and to prevent accidents such as dropping, displacement or shaking of the edge-emitting laser.

Figure 11:
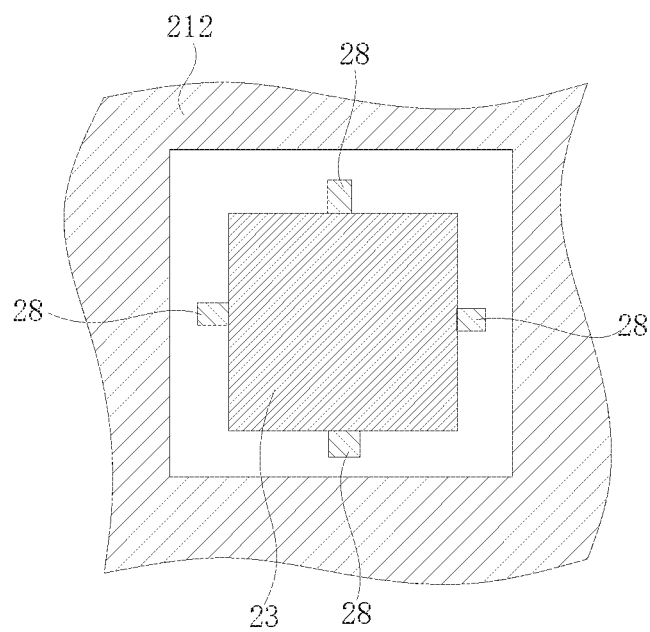

As illustrated in FIG. 8 and FIG. 11, in some embodiments, the light source 23 may also be fixed to the substrate component 21 in a fixed manner illustrated in FIG. 11. In detail, the laser projector 20 includes a plurality of support blocks 28. The plurality of support blocks 28 may be fixed to the substrate component 21. The plurality of support blocks 28 collectively surrounds the light source 23. The light source may be mounted directly between the plurality of support blocks 28 during installation. In one example, the plurality of support blocks 28 collectively clamps the light source 23 to further prevent the light source 23 from shaking.

In some embodiments, the protective 26 may be omitted. At this time, the diffractive optical element 25 may be disposed in the receiving cavity 221, and the diffractive emission plane 254 of the diffractive optical element 25 may be pressed against the top wall 222. The laser light passes through the diffractive optical element 25 and then passes through the light through hole 2212. Thus, the diffractive optical element 25 is less likely to fall off.

In some embodiments, the substrate 211 may be omitted and the light source 23 may be directly bonded to the circuit board 212 to reduce overall thickness of the laser projector 20. Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, such as two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art. It is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The above-mentioned storage medium may be a read-only memory, a magnetic disc, an optical disc, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for generating a verification template, the verification template comprising an infrared template and a depth template, and the method comprising:
   obtaining an infrared image of a target object and storing the infrared image into a trusted execution environment as the infrared template;
   controlling a laser projector to project laser light to the target object;
   obtaining a laser pattern modulated by the target object; and
   processing the laser pattern to obtain a depth image and storing the depth image into the trusted execution environment as the depth template.

2. The method according to claim 1, further comprising:
   obtaining a color image of the target object and storing the color image into a rich execution environment; and
   obtaining the color image from the rich execution environment and controlling a display screen to display the color image.

3. The method according to claim 1, wherein obtaining the laser pattern modulated by the target object comprises obtaining a plurality of laser pattern frames modulated by the target object and processing the laser pattern to obtain the depth image comprises:

processing each of the plurality of laser pattern frames to obtain a plurality of initial depth image frames; and combining the plurality of initial depth image frames to obtain the depth image.

4. The method according to claim 3, wherein the plurality of initial depth image frames are obtained from a plurality of different angles.

5. The method according to claim 1, wherein codes and a memory area in the trusted execution environment are controlled by an access control unit and are inaccessible to programs in the rich execution environment.

6. A system for generating a verification template, wherein the verification template comprises an infrared template and a depth template, the system comprises a microprocessor and an application processor, and the microprocessor is configured to:

obtain an infrared image of a target object and store the infrared image into a trusted execution environment as the infrared template;

control a laser projector to project laser light to the target object;

obtain a laser pattern modulated by the target object; and process the laser pattern to obtain a depth image and store the depth image into the trusted execution environment as the depth template.

7. The system according to claim 6, wherein the application processor is configured to:

obtain a color image of the target object and store the color image into a rich execution environment; and obtain the color image from the rich execution environment and control a display screen to display the color image.

8. The system according to claim 6, wherein the microprocessor is configured to:

obtain a plurality of laser pattern frames modulated by the target object;

process each of the plurality of laser pattern frames to obtain a plurality of initial depth image frames; and combine the plurality of initial depth image frames to obtain the depth image.

9. The system according to claim 8, wherein the plurality of initial depth image frames are obtained from a plurality of different angles.

10. The system according to claim 6, wherein the microprocessor is coupled to the trusted execution environment via a mobile industry processor interface.

11. The system according to claim 6, wherein codes and a memory area in the trusted execution environment are controlled by an access control unit and are inaccessible to programs in the rich execution environment.

12. A terminal for generating a verification template, wherein the verification template comprises an infrared template and a depth template, the terminal comprising:

an infrared camera, configured to collect an infrared image of a target object;

a laser projector, configured to project laser light to the target object;

a microprocessor; and an application processor, the microprocessor is configured to:

obtain the infrared image of the target object and store the infrared image into a trusted execution environment as the infrared template;

control the laser projector to project the laser light to the target object;

obtain a laser pattern modulated by the target object; and process the laser pattern to obtain a depth image and store the depth image into the trusted execution environment as the depth template.

13. The terminal according to claim 12, wherein the application processor is configured to:

obtain a color image of the target object and store the color image into a rich execution environment; and obtain the color image from the rich execution environment and control a display screen to display the color image.

14. The terminal according to claim 12, wherein the microprocessor is configured to:

obtain a plurality of laser pattern frames modulated by the target object;

process each of the plurality of laser pattern frames to obtain a plurality of initial depth image frames; and combine the plurality of initial depth image frames to obtain the depth image.

15. The terminal according to claim 14, wherein the plurality of initial depth image frames are obtained from a plurality of different angles.

16. The terminal according to claim 12, wherein the microprocessor is coupled to the trusted execution environment via a mobile industry processor interface.

17. The terminal according to claim 12, wherein codes and a memory area in the trusted execution environment are controlled by an access control unit and are inaccessible to programs in the rich execution environment.

18. The terminal according to claim 12, wherein the microprocessor is coupled to the infrared camera, and the microprocessor is coupled to the laser projector.

19. The terminal according to claim 12, further comprising:

an infrared fill lamp, configured to emit infrared light, and be coupled to the application processor.

* * * * *